US007962140B2

(12) United States Patent
Feng et al.

(10) Patent No.: US 7,962,140 B2
(45) Date of Patent: Jun. 14, 2011

(54) METHOD AND SYSTEM FOR HANDOVER BETWEEN WIRELESS LOCAL AREA NETWORK AND WIRELESS WIDE AREA NETWORK

(75) Inventors: Lei Feng, Shanghai (CN); Xiaoling Shao, Shanghai (CN); Xiaohui Jin, Shanghai (CN); Yonggang Du, Shanghai (CN); Bo Liu, Shanghai (CN); Xiaolu Sun, Shanghai (CN)

(73) Assignee: ST-Ericsson SA, Geneva (CH)

( * ) Notice: Subject to any disclaimer, the term of this patent is extended or adjusted under 35 U.S.C. 154(b) by 998 days.

(21) Appl. No.: 10/571,815

(22) PCT Filed: Aug. 19, 2004

(86) PCT No.: PCT/IB2004/051496
§ 371 (c)(1),
(2), (4) Date: Mar. 15, 2006

(87) PCT Pub. No.: WO2005/029901
PCT Pub. Date: Mar. 31, 2005

(65) Prior Publication Data
US 2007/0082671 A1 Apr. 12, 2007

(30) Foreign Application Priority Data

Sep. 19, 2003 (CN) .................................. 03 1 24909

(51) Int. Cl.
*H04W 36/00* (2009.01)
*H04W 4/00* (2009.01)
*H04M 1/00* (2006.01)
(52) U.S. Cl. ...................... 455/437; 455/436; 455/432.1; 455/552.1; 455/553.1; 370/331
(58) Field of Classification Search ............... 455/432.1, 455/432.3, 433, 435.1, 435.2, 436, 437, 552.1, 455/553.1; 370/331, 338
See application file for complete search history.

(56) References Cited

U.S. PATENT DOCUMENTS

| 6,842,449 | B2 * | 1/2005 | Hardjono ...................... 370/352 |
| 7,200,112 | B2 * | 4/2007 | Sundar et al. .................. 370/230 |
| 2004/0023669 | A1 * | 2/2004 | Reddy ......................... 455/456.1 |

FOREIGN PATENT DOCUMENTS

| DE | 100 42 961 A1 | 3/2002 |
| JP | 2003-264868 | 9/2003 |
| WO | WO 00/51375 A1 | 8/2000 |
| WO | WO 02/054820 A2 | 7/2002 |

OTHER PUBLICATIONS

International Search Report dated May 3, 2005 in connection with PCT Application No. PCT/IB2004/051496.
Written Opinion of the International Searching Authority dated Mar. 19, 2006 in connection with PCT Application No. PCT/IB2004/051496.
Prasad, R, et al., "WLANs and WPANs towards 4G wireless", 2003, Artech House, US, p. 25-62.
Translation of Office Action dated Jun. 11, 2010 in connection with Japanese Patent Application No. 2006-526739.

* cited by examiner

*Primary Examiner* — Un C Cho (57) ABSTRACT

A method to be performed by a user terminal with WWAN and WLAN interfaces, comprising steps of: communicating via the WWAN interface; inspecting whether its WLAN interface is available; entering into a WWAN-to WLAN state from a WWAN active state if its WLAN interface is available; said user terminal provides a public server with known network address with its presence information said WWAN-to-WLAN state; and acquiring the network address of another user terminal communicating with said user terminal from said server, sending a WLAN call request to said another user terminal by using said address; entering into WLAN active state after receiving the message for accepting the WLAN call request from said another user terminal.

31 Claims, 6 Drawing Sheets

METHOD AND SYSTEM FOR HANDOVER BETWEEN WIRELESS LOCAL AREA NETWORK AND WIRELESS WIDE AREA NETWORK

CROSS-REFERENCE TO RELATED APPLICATION(S)

The present application claims priority under 35 U.S.C. §365 to International Patent Application No. PCT/IB2004/051496 filed Aug. 19, 2004, entitled "COMMUNICATION METHOD AND APPARATUS FOR HANDOVER BETWEEN WIRELESS WIDE AREA NETWORK AND WIRELESS LOCAL AREA NETWORK". International Patent Application No. PCT/IB2004/051496 claims priority under 35 U.S.C. §365 and/or 35 U.S.C. §119(a) to Chinese Patent Application No. 03124909.4 filed Sep. 19, 2003 and which are incorporated herein by reference into the present disclosure as if fully set forth herein.

FIELD OF THE INVENTION

The present invention relates generally to a communication method and apparatus, and more particularly, to a communication method and apparatus for handover between wireless Wide Area Network (WWAN) and Wireless Local Area Network (WLAN).

TECHNICAL BACKGROUND

WLAN is a flexible data communication system, usually deployed in so-called hotspots, such as airports and hotels, to provide data transmission services. People can use wireless terminals, such as mobile phones or laptops, via wireless access, to access the network resources in a WLAN, and the resources on Internet connected with the WLAN.

WWAN is a communication system which covers more broader areas, and is deployed to provide voice and data services. For example, Global System for Mobile Communication (GSM), General Packet Radio Service (GPRS), Code Division Multiple Access (CDMA) and Third-Generation Mobile Communication (3G) systems all fall in the category of WWAN.

Generally, WWAN provides voice service, whereas WLAN provides data service. However, with the development of communication technologies, the requirement for low-speed data services has emerged in WWAN, and IP-based voice service (VOIP) has also become a new spotlight in WLAN.

Figure 1:
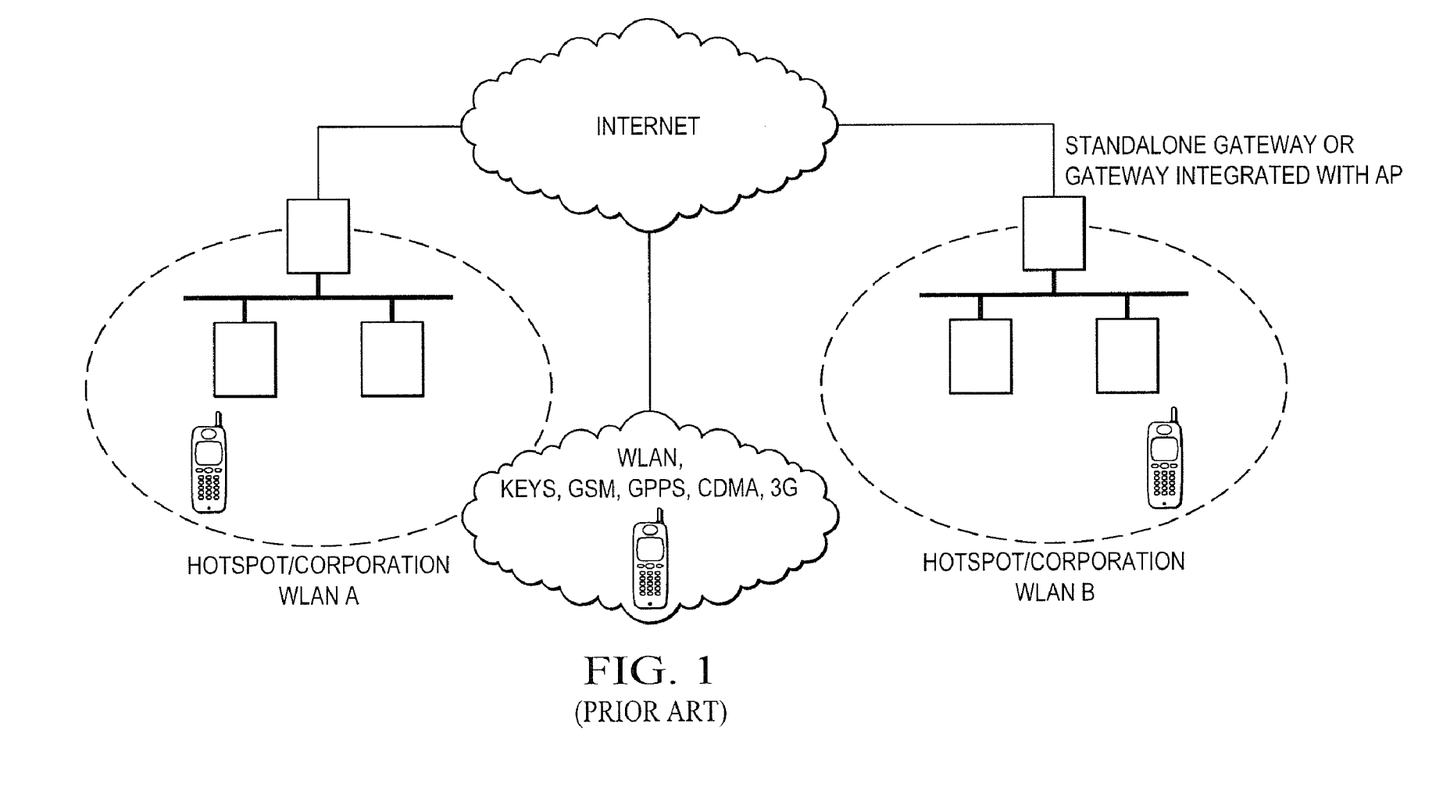
FIG. 1 is a schematic diagram illustrating conventional WLAN and WWAN mobile combo products.

FIG. 1 shows the typical use of conventional WLAN and WWAN mobile combo products, wherein the WWAN service area may or may not overlap with the WLAN service area (as shown in FIG. 1). In the process where a mobile user out of WLAN service area is making a voice call via WWAN service, said user may enter into a WLAN service area due to the change of his position. If both parties are in the range of WLAN and they still employ the service of WWAN, their communication cost would not be reduced; but if the WWAN service is switched to the WLAN service, not only the WWAN radio resource but also the cost for end users can be saved greatly. Moreover, richer services, such as video call, can be provided. If one party of the communication is leaving the WLAN service area, it should handover the WLAN service back to WWAN service to ensure that the communication can go on.

As mentioned above, a communication method and apparatus is needed to handover between WWAN and WWLN, so as to effectively reduce the cost for users and save network resources of WWAN.

SUMMARY OF THE INVENTION

An object of the present invention is to provide a method and apparatus for handover between WLAN and WWAN. With the proposed method and apparatus, if two end users are not both in the WLAN service area, they will use WWAN to communicate; if both of them enter into the range of WLAN, their communication can handover to WLAN service; and if either of the two end users is about to leave the service area of WLAN, their communication can handover back to WWAN service again, which can save the WWAN resource, and utilize the WLAN resource more effectively and save communication cost for end users as well.

A method to be performed by a mobile terminal with WWAN and WLAN interfaces according to the present invention, comprises steps of: communicating via the WWAN interface; detecting whether its WLAN interface is available; entering into a WWAN-to-WLAN state from a WWAN active state if its WLAN interface is available; providing its presence information to a public server with known address in said WWAN-to-WLAN state; acquiring the address of another terminal communicating with said terminal from said server; sending a WLAN call request to said another terminal by using said address; entering into a WLAN active state after receiving the message for accepting the WLAN call request from said another terminal.

A method is proposed in the present invention, to be performed by a mobile terminal with WWAN and WLAN interfaces, comprising steps of: communicating via the WWAN interface; receiving a WLAN call request from said another terminal; sending a response for accepting the WLAN call request to said another terminal if the profile information indicates that said terminal can switch radio interfaces during communication course; and entering into the WLAN active state.

A method is proposed in the present invention, performed by a mobile terminal with WWAN and WLAN interfaces, comprising steps of: communicating via the WLAN interface; detecting its WLAN interface is available; entering into a WLAN-to-WWAN state from a WLAN active state if its WLAN interface is not available; sending a WWAN call request to said another terminal in the WLAN-to-WWAN state; entering into the WWAN active state if receiving the message for accepting the WWAN call request from said another terminal.

A method is proposed in the present invention, performed by a mobile terminal with WWAN and WLAN interfaces, comprising steps of: communicating via the WLAN interface; detecting whether its WLAN interface available; entering into a WLAN-to-WWAN state from a WLAN active state if its WLAN interface is not available; sending a handover request to said another terminal in the WLAN-to-WWAN state; sending a message for accepting the WWAN call request to said another terminal after receiving the WWAN call request from said another terminal and entering into the WWAN active state.

DETAILED DESCRIPTION OF THE INVENTION

A mobile terminal with dual interfaces (WLAN and WWAN) is taken as an example in the following description, elaborating on the procedures of communicating via the WWAN interface before entering the WLAN service area, handover to communicate via the WLAN interface after entering the WLAN service area, and handover to communicate via the WWAN interface when either of the communicating terminals leaves the WLAN service area. In all embodiments of the present invention, all conclusions are made on the assumption that the WWAN interface is available under any circumstances, the WLAN interface is only available in the WLAN service area, and the mobile terminal can only communicate via the WWAN interface once it leaves the WLAN service area.

Thus, the present invention introduces six working states in the following, to illustrate more clearly the procedure for the mobile terminal to handover between different interfaces. When in different states, the mobile terminal will perform different operations to ensure successful handover and normal communication. First of all, we will describe the six working states for the mobile terminal, in conjunction with FIG. 2.

1. WWAN Idle State

Figure 2:
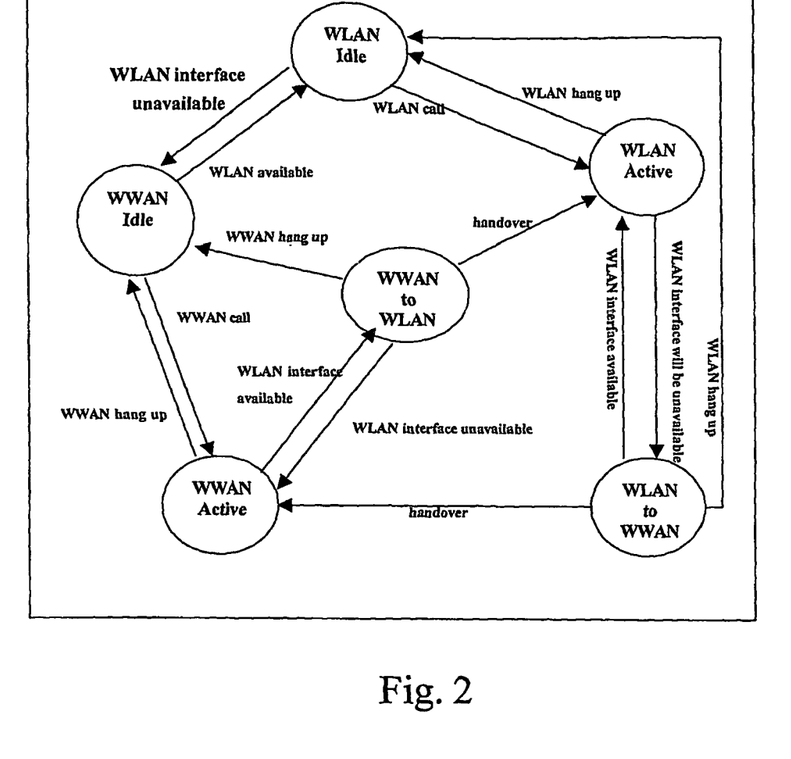
FIG. 2 is a state diagram for a mobile terminal to handover between six states in accordance with the present invention.

Here, the mobile terminal is not conducting any radio connection with other terminals, and only the WWAN interface is available. In this state, the mobile terminal waits for a call request sent via the WWAN interface from another terminal; or accepts call commands from the user interface so as to send a call request to said another terminal; or inspects the status of the WLAN interface so as to handover to the WLAN Idle state when the WLAN interface is available.

The mobile terminal in WWAN Idle state will enter into WLAN Idle state when it inspects that the WLAN interface is available. And when the mobile terminal in WWAN state sends a WWAN call request to another terminal or receives a WWAN call request from said another terminal, it will establish a WWAN call in normal mode and enter into WWAN Active state.

2. WLAN Idle State

Here, the mobile terminal is not conducting radio connection with other terminals, but the WLAN and WWAN interfaces are both available. In this state, the mobile terminal waits for the call request sent from another terminal via the WLAN interface or WWAN interface; or accepts call command from the user interfaceso as to send a WLAN or WWAN call request to another terminal; inspects the status of the WLAN interface so as to handover to WWAN Idle state when the WLAN interface is unavailable; and registers/deregisters its presence information to the public server with known network address, wherein the presence information at least includes: network address, connection type and port information of the mobile terminal.

When the mobile terminal in WLAN Idle state inspects that its WLAN interface is unavailable, it will enter WWAN Idle state. When the mobile terminal in WLAN Idle state sends a WLAN call request to another terminal or receives a WLAN call request from another terminal, it will establish a traditional WLAN call procedure. In addition, the mobile terminal in WLAN Idle state can also send a WWAN call request to another terminal that rejects the WLAN call, or receive a WWAN call request from said another terminal. When said mobile terminal sends a WWAN call request or receives a WWAN call request, a traditional WWAN call procedure will be established.

3. WWAN Active State

Only the WWAN interface is available here, and the mobile terminal is communicating with other terminals through the WWAN interface. In this state, the mobile terminal handles the call signaling and traffic information via the WWAN interface in conventional communication mode using WWAN interface (such as the communication mode in GSM and CDMA systems); accepts the hang-up command from the user interface so as to end the WWAN communication; and inspects the status of the WLAN interface so as to transfer to WWAN-to-WLAN state when the WLAN interface is available.

When the mobile terminal in WWAN Active state inspects that the WLAN interface is available, if the mobile terminal is allowed to transfer to the WLAN during communication by its user profile, it enters into WWAN-to-WLAN state. When the communicating terminal or its peer hangs up the call, the mobile terminal in WWAN Active state will stop WWAN communication and enter into WWAN Idle state.

4. WLAN Active State

The WLAN and WWAN interfaces are both available here, and the mobile terminal is communicating with other terminal via the WLAN interface. In this state, the mobile terminal handles the call signaling and traffic information in conventional communication mode using WLAN interface (such as the communication mode in H.323 and SIP systems), accepts hang-up command from the user interface, and inspects the status of the WLAN interface so as to transfer to WLAN-to-WWAN state when the WLAN interface is going to be unavailable.

When the mobile terminal in WLAN active state inspects that the WLAN interface is unavailable or the mobile terminal receives a request for handover to WWAN from its peer, the mobile terminal will transfer to WLAN-to-WWAN state if its user profile allows handover to WWAN during call procedure. When the mobile terminal or its peer hangs up the call, the mobile terminal in WLAN Active state will end WLAN communication and enter into WLAN Idle state.

5. WWAN-to-WLAN State

This state is a transition state for transferring a call from the WWAN interface to the WLAN interface. In this state, the mobile terminal handles the call signaling and traffic information from the WWAN interface, accepts hang-up command from the user interface so as to end WWAN communication, inspects the status of its WLAN interface so as to return WWAN Active state when the WLAN interface is unavailable, and registers/deregisters its presence information to the public server with known address, wherein the presence information at least includes: network address, connection type and port information of the mobile terminal.

When preparing for transiting from WWAN Active state to WLAN Active state, the mobile terminal will obtain the status information of its communicating peer (such as the peer's availability in the WLAN service area, and the peer's network address, communication protocols and port number) from the above public server, by using Push or Pull method. If said peer's network address is not included in the status information, the mobile terminal has to request said public server for its peer's network address, and it is also responsible for initiating the WLAN call setup procedure after obtaining its peer's network address.

When the mobile terminal in WWAN-to-WLAN state inspects its WLAN interface is not available, it will transfer back to WWAN Active state. When the communicating mobile terminal or its peer hangs up the call, the mobile terminal will end the communication and transfer to WWAN Idle state (in principle, it is possible to transfer to WLAN Idle state directly, but allowing for implementation we design this transition via the WWAN Idle state). If both sides agree handover according to their private user profiles during call procedure, the mobile terminal will transfer to WLAN Active state.

The detailed steps for Push/Pull method and handover procedure will be described in the following.

6. WLAN-to-WWAN State

This state is also a transition state, i.e. transferring a call from WLAN interface to WWAN interface. In this state, the mobile terminal handles the call signaling and traffic information from the WLAN interface, accepts hang-up command from the user interface so as to end the WLAN call, and inspects the status of the WLAN interface so as to go back to WLAN Active state when the WLAN interface is available.

When preparing for handover from WLAN Active state to WWAN Active state, the mobile terminal is responsible for looking up its peer's related is information (such as phone number) through the information pre-stored in local profile, and then initiates the WWAN call setup procedure.

When the mobile terminal in WLAN-to-WWAN state inspects that its WLAN interface is available, it will go back to WLAN Active state. When the mobile terminal or its peer in communication hangs up the call or the communication connection is broken down, the mobile terminal will end communication and transfer to WLAN Idle state (in principle, it is possible to transfer to WWAN Idle state directly when the WLAN connection is broken down, but allowing for implementation we design this transition via the WLAN Idle state). The mobile terminal will transfer to WWAN Active state if both sides agree handover during call procedure according to their user profiles.

The detailed steps for handover will be described in the following section.

As mentioned above, a UE with dual radio interfaces (WWAN and WLAN interfaces) will handover between the above six states when entering into the WLAN service area. In order to transfer from one state to another smoothly, the detailed steps for handover are implemented through the collaboration of a Smart Agent module in said mobile terminal and a Smart Server module in said public server. Thus, a brief introduction will first be given to the Smart Agent in said mobile terminal and the Smart Server before the handover procedures are described in detail.

1. The Smart Agent

Figure 3:
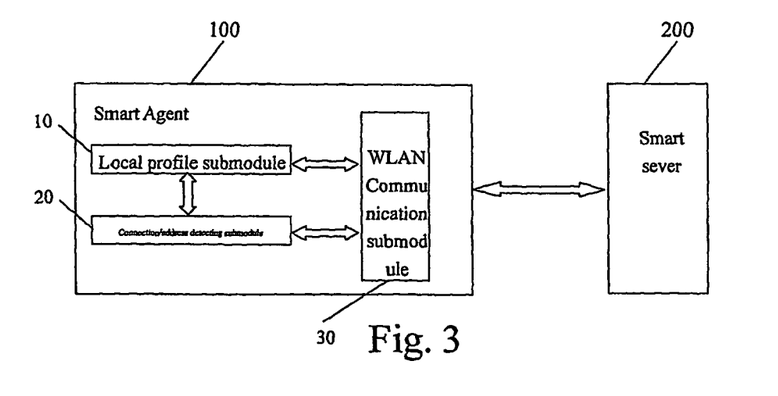
FIG. 3 is a schematic diagram illustrating the composition of the Smart Agent module and its connection with the Smart Server in accordance with the present invention.

Smart Agent 100 is a function block running in the mobile terminal, including: local configuration module 10, connection/address detection module 20 and WLAN module 30.

FIG. 3 illustrates the structure of Smart Agent 100 and its connection with Smart Server 200. A detailed description to all modules of the Smart Agent will be offered in the following.

(1) The local configuration module is used for setting the local configuration information of the mobile terminal according to user's instructions, based on user profile of the mobile terminal. The local configuration information relates to each communication buddy's connection type, user id for each connection type, and user preference for each connection type.

For example, a mobile terminal user A has a roster list including user B and user C. Then, with the help of the local configuration module, the local configuration information of user A can be illustrated in programming language as follows:

```
<self name='usera'>
    <connection type='gsm'>
        <priority>low</priority>
        <id>13000000000</id>
    </connection>
    <connection type='jabber'>
        <priority>high</priority>
        <id>usera@somejabberserver.com</id>
        <pwd>password4usera</pwd>
    </connection>
    <connection type='MSN'>
        <priority>high</priority>
        <id>usera@hotmail.com</id>
        <pwd>password4usera</pwd>
    </connection>
</self>
<user name='userb'>
    connection type='gsm'>
        <id>+86-13000000001</id>
    </connection>
    <connection type='jabber'>
        <id>userb@somejabberserver.com</id>
    </connection>
</user>
<user name='userc'>
    connection type='gsm'>
        <id>+86-13000000002</id>
    </connection>
</user>
```

The above local configuration information configuring for user A means that user A has three connection types, in which jabber connection and MSN connection in WLAN interface have higher priority than GSM connection in WWAN interface; user B has two connection types available, in which jabber connection via WLAN interface has higher priority than GSM connection via WWAN interface; user C only has GSM connection. When user A is going to communicate with user B, user A could choose different interfaces according to whether the WLAN interfaces of both sides are available, i.e. if WLAN interfaces of user A and user B are both available. User A will contact user B via the WLAN interface since WLAN connection has the higher priority according to said local configuration. But user B only supports jabber connection via WLAN interface, so user A can only find user B's network address and communicate with user B via jabber connection. If either WLAN interface in user A or user B is unavailable, or user A's MSN connection and user B's jabber connection are available but user A's jabber connection is unavailable, user A can only contact user B via GSM connection. When user A is going to contact user C, because only GSM connection is available for user C, user A could only contact user C via WWAN interface.

In the above mentioned process of choosing connection type when user A is about to communicate with user B, if the two kinds of instant message servers (MSN and jabber) are both integrated into the Smart Server, and the information in these two instant message servers are shareable, i.e. user with only jabber connection will be able to get the network address of another user who has logged in MSN, then when user A's MSN connection and user B's jabber connection are available while user A's jabber connection is not available, user A and user B can still establish a WLAN call via the WLAN interface.

Besides, if a mapping relationship is established between user's GSM identification (IMSI: International Mobile Subscriber Identification) and user's ID in MSN and jabber server, with the GSM identification a user can directly get its communication peer's network address of any network (MSN or jabber) which the communication peer has logged in, then the local configuration information of user A in the above example can simply include only its communication peer's GSM identification.

(2) The connection/address detection module is used by the mobile terminal to register/deregister itself to the Smart Server with its presence information when the mobile terminal enters into or leaves the WLAN service area, and to obtain the network address of its peer that is going to communicate with it via WLAN from the Smart Server.

In the communication system via WWAN interface, a user establishes radio connection by using its own IMSI, which will not change with the mobility of the user. However, in the communication system via WLAN interface, a user will enter or leave different WLAN areas of different hotspots because of user's mobility. Then, the network address of the terminal used by the user, i.e. user terminal's network address may change when the user enters or leaves the WLAN service area. So it is very important to get the user terminal's network address timely in implementing communication via WLAN interface. Thus, a connection/address detection module is proposed in n the present invention. Once detecting the availability/unavailability of its WLAN interface, a user terminal can inform the Smart Server about its presence information when entering/leaving a WLAN service area. This means that the Smart Server, as a communication center, maintains all terminals' presence information and absence information, and each user in the WLAN service area can obtain the present network address of each of its communication buddies through the Smart server.

According to different configurations of the Smart Server, the connection/address detection module can get the communication peer's network address with Push/Pull method. In the following, a detailed description will be given to these two methods.

Figure 4:
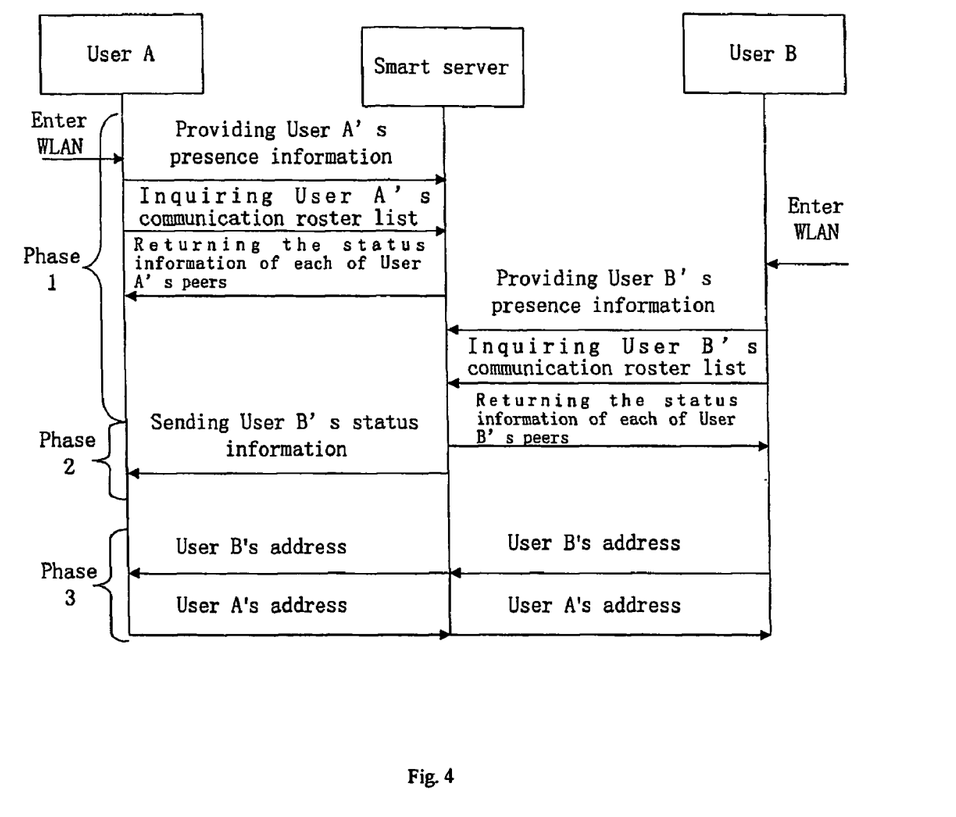
FIG. 4 is a schematic diagram illustrating the IP address exchange procedure between communicating terminals by using the Push method in accordance with the present invention.

FIG. 4 illustrates how to get user terminal's network address with Push method in present invention. In FIG. 4, once user A enters into a WLAN service area, the connection/address detection module in user A's terminal will detect the availability of its WLAN interface, and register its presence information to the Smart Server if its WLAN interface is available. The presence information includes: user A's network address (such as IP address), connection type (TCP: Transmission Control Protocol), UDP (User Datagram Protocol), RTP (Real-time Transmission Protocol) and port number. The Smart Server maintains the presence information for each available terminal. Then, user A sends a request for inquiring its communication roster list to the Smart Server, and updates each buddy's presence status in its local configuration information after receiving its communication buddies' status information from the Smart Server (stage 1). In FIG. 4, user A obtains the status for user B as "unavailable" before user B enters into the WLAN service area. When user B enters into a WLAN service area, because in the Push method, when the Smart Server gets the presence information about a user, it will send the presence information to all related communication buddies timely. So user A can receive the new status information of user B from the Smart Server immediately, thus user B's status in user A's local configuration information can be updated as "available" (stage 2). The presence information which is sent from the Smart Server to user A can include user B's availability as well as its network address. If user B's network address is included in the presence information, user A can get user B's network address directly; but if user B's network address is not included in the presence information, then user A has to receive the information about user B's network address from the Smart Server so as to establish a radio connection using that address when user A is going to make a WLAN call to user B (stage 3).

Figure 5:
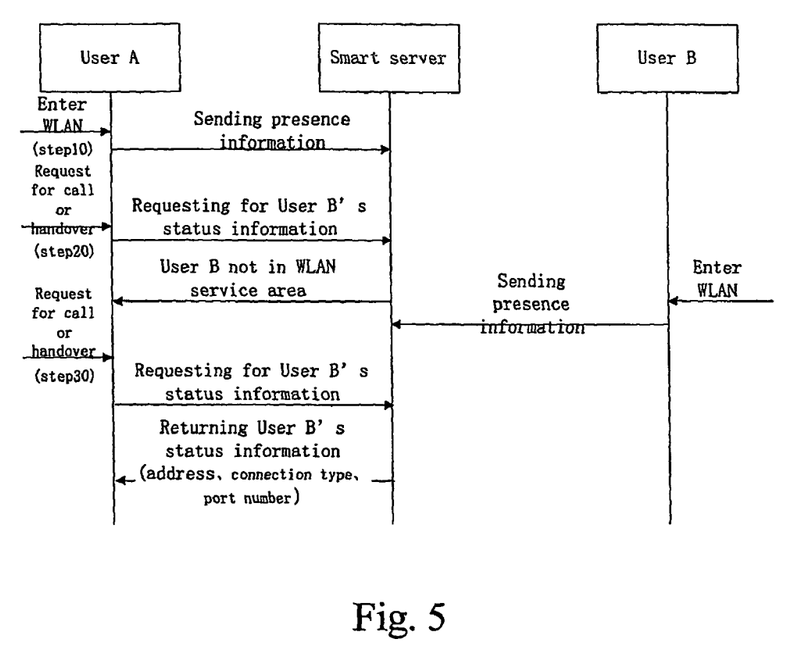
FIG. 5 is a schematic diagram illustrating the IP address exchange procedure between communicating terminals by using the Pull method in accordance with the present invention.

FIG. 5 illustrates how to get user terminal's network address with Pull method in the present invention. As shown in FIG. 5, once user A enters into a WLAN service area, same as in Push method, the connection/address detection module in user A's terminal will detect the availability of its WLAN interface, and register its presence information to the Smart Server if its WLAN interface is available (step 10). The Smart Server maintains the presence information registered by user A. But Different t from Push method, in Pull method, the Smart Server doesn't announce the communication buddies' availability information initiatively to each user, but just maintains each user's presence information. Only when a user in the WLAN service area is going to make a WLAN call or transfer to the WLAN service during a call, a request will be sent to the Smart Server requesting for the called peer's status information, thus the status information of the called peer stored in the smart server will be sent to said user. Referring to FIG. 5, when user A who has just entered into the WLAN service area is going to make a WLAN call to user B or the communicating user A tries to transfer to communicate with user B via the WLAN interface, user A will send a status enquiry request to the Smart Server in order to get user B's status information (step 20). If user B is not in the WLAN service area, the status information about user B from the smart server received by user A is "unavailable". If when user A sends the status enquiry request to the Smart Server (step 30), and user B has just entered into WLAN service area, user A will receive user B's status information, including network address, connection type, port number and so on which used by user B. According to the status information about user B received from the Smart Server, user A will try to make a WLAN connection with user B via the WLAN interface. The above steps 10, 20 and 30 are all executed by user A.

After detecting the availability/unavailability of the user terminal's WLAN interface with the above Push/Pull method, the connection/address detection module can register the presence information of the user terminal to the Smart Server timely, as well as obtain and update each communication buddy's status information according to the status information about each of its communication buddies from the Smart Server. In this way, when a user wants to establish WLAN connection with one of its communication buddies, it can get the peer's accurate network address timely.

(3) The WLAN communication module is designed to establish or release a WLAN call, and to handover from WWAN to WLAN or from WLAN to WWAN automatically during communication process.

When a mobile terminal in WLAN service area is going to make a call to another one in the WLAN service area, if the WLAN interfaces of both sides are available, and if the local configuration information on both sides indicates that the connection on WLAN interface is preferable when both WLAN and WWAN interfaces are available, the WLAN communication module in the mobile terminal will get its peers network address via the above mentioned connection/address detection module, and attempt to establish a WLAN connection in a special mode or the mode as described in H.323 or SIP systems.

When a mobile terminal who is communicating with another terminal via the WWAN interface enters a WLAN service area, if the WLAN interfaces of both sides are available and the local configuration information on both sides indicates that the WLAN interface will be preferred when the WWAN and WLAN interfaces are both available, and meanwhile the user profiles of both sides allow handover from WWAN to WLAN, the WLAN communication module of said mobile terminal will select a connection type and try to establish WLAN connection with its peer using the network address corresponding to the selected connection type, according to the status information of its peer (including the network address, connection type and port number of the peer) obtained by the connection/address detection module. The WLAN communication module instructs the mobile terminal to communicate with different radio interfaces depending on whether said WLAN connection succeeds or not. If said WLAN connection succeeds, e.g. the ACK message from its peer is received, the WLAN interface will be used for communication. If said WLAN connection fails, e.g. the message for rejecting the use of WLAN interface is received or the WLAN interface turns to be unavailable, communication using the WWAN interface will be continued.

When one of the communication parties via WLAN interfaces is going to leave the WLAN service area, if the user profiles on both parties allow handover from WLAN to WWAN, the WLAN communication module will perform different handover depending on whether the party who is going to leave is the initiator of the WLAN connection or not. If the leaving one is the initiator of the WLAN connection, it will send a request for establishing a WWAN call to its peer, and then transfers to WWAN interface to carry out communication after receiving the ACK message. If the leaving one is not the initiator of the WLAN connection, it will first send a request for handover to WWAN interface to its peer. On receipt of the ACK message for receiving the handover request and the request for establishing a WWAN call, said terminal transfers to the WWAN interface, and sends an ACK message for establishing WWAN call so that the peer can also transfer to WWAN interface to carry out communication.

According to the above explanation to the local configuration module, connection/address detection module and WLAN communication module, the functions of the Smart Agent running in the mobile terminal are described in detail. Another important component—the Smart Server, which concerns the handover method in the present invention, will be introduced in the following.

2 The Smart Server

The Smart Server is a function module running in a public server with publicly known network address. The Smart Server sets a communication buddy roster list for each registered user. When one user enters or leaves a WLAN service area, said server registers the presence or absence status information of said user, and informs all the buddies in this WLAN service area about the information.

An example describes the communication buddy roster list for user A in programming language as follows:

```
<user id='userb@wlan_wwan_server.com'>
    <status>available</status>
</user>
<user id=' userrc@wlan_wwan_server.com'>
    <status>unavailable</status>
</user>
<user id=' userd@wlan_wwan_server.com'>
    <status>unavailable</status>
</user>
```

Wherein user id is the unique identification of the user in WLAN, status indicates whether said user is in WLAN service area or not. The above roster list shows: user A has three communication buddies in the WLAN service area belonging to said server—user B, user C and user D with identifications respectively as userb@wlan_wwan_server.com, userc@wlan_wwan_server.com and userd@wlan_wwan_server.com. Among them, only user B is in the WLAN service area now, whereas user C and user D is not in the WLAN service area. At this time, user A can only communicate with user B via WLAN interface. If user A wants to communicate with user C or user D, WWAN interface is the only resort. Herein, user A and user B may be in different WLAN service areas in different hotspots connected through Internet.

Just as illustrated in the above section describing the connection/address detection module of the Smart Agent in a mobile terminal in accordance with the proposed method for handover between different radio interfaces, the Smart Server is a pivot for different users in the service area to exchange network addresses. Through the smart server, a user attempting to communicate via the WLAN interface can get the peer's network address and then establish a WLAN connection using this address.

The Smart Server can be an instant message server, such as MSN, Yahoo messenger, jabber, or a stand-alone server run by the ISP.

In this embodiment, user A can modify the communication buddy roster list in the Smart Server via Web page, such as adding or deleting a communication buddy entry.

When a communicating user enters or leaves a WLAN service area, the mobile terminal will handover between the above six working states through the cooperation of the Smart Agent in said user's mobile terminal and the Smart Server in the public server. Examples about the communicating user A and user B will respectively be given to describe the procedures for mobile terminal A and mobile terminal B to handover from WWAN to WLAN and from WLAN to WWAN, in conjunction with FIG. 6 and FIG. 7.

1. Handover from WWAN Interface to WLAN Interface

Figure 6:
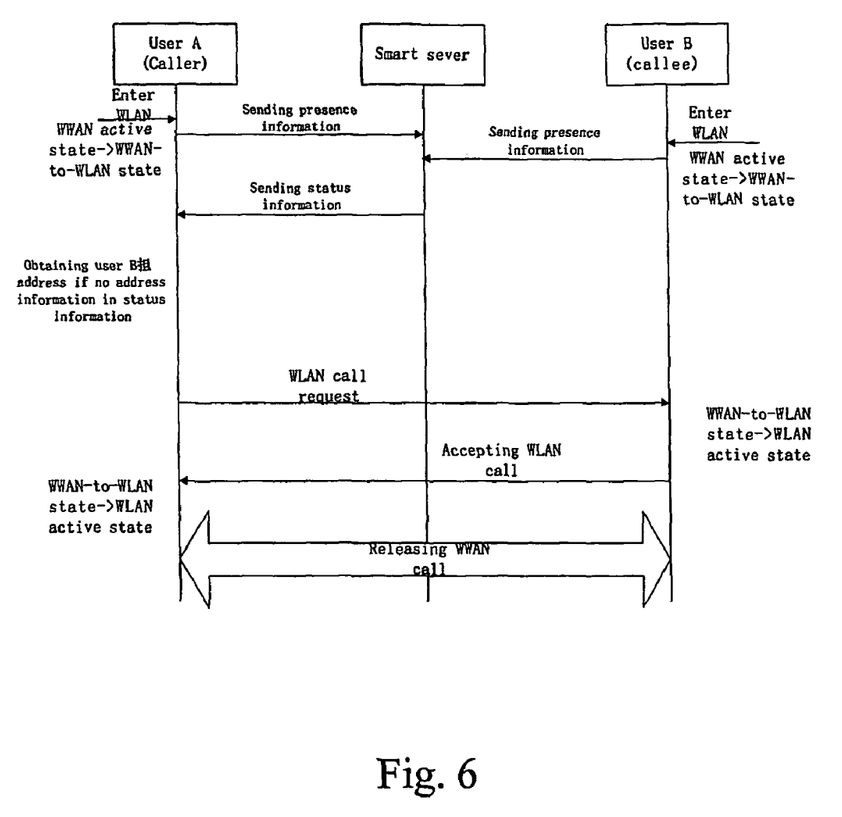
FIG. 6 is a schematic diagram illustrating the handover from WWAN interface to WLAN interface in accordance with the present invention.

As shown in FIG. 6, when user A communicating with user B via WWAN interface enters into the WLAN service area, if the Smart Agent in terminal A detects that its WLAN interface is available, terminal A will handover to WWAN-to-WLAN state from WWAN Active state. When user B, the communicating peer of user A, enters into the WLAN service area also, the Smart Agent in terminal B detects that its WLAN interface is available, then terminal B will also handover from WWAN Active state to WWAN-to-WLAN state.

While in WWAN-to-WLAN state, terminal A and terminal B respectively provide their presence information to said Smart Server, including network address, connection type and port number of terminals A and B. Providing that the handover procedure from WWAN interface to WLAN interface is initiated by the calling terminal A, the detailed procedure is as follows: first, terminal A acquires the network address of the called terminal B through the smart server using Push or Pull method as described above. After obtaining the network address of terminal B, terminal A makes the decision whether to communicate with terminal B by using the WLAN interface depending on the user profile. If the local configuration information indicates that the WLAN interface is preferred for terminal A to communicate, terminal A will send a WLAN call request to terminal B using the network address of terminal B obtained from the Smart Server.

On receipt of the call request from terminal A, if the user profile of terminal B allows handover between different radio interfaces, terminal B sends a response message for accepting the WLAN call request to terminal A, and enters into WLAN Active state. Terminal A will enter into WLAN Active state after receiving the message for accepting the WLAN call request from terminal B. Once terminals A and B both have been in WLAN Active state, the radio resource formerly occupied by WWAN communication is released, and the two terminals can communicate via WLAN interface. Communication carried on via WLAN interface can relates to voice or video information, depending on the user profile and Internet resources available.

However, If user B' profile disallows handover between different radio interfaces during communication, terminal B will send a message for rejecting this WLAN call request to terminal A. In this case, terminal A and terminal B have to stay in WWAN-to-WLAN state. If terminal B's user modifies its user profile via the user interface (i. e. handover between radio interfaces during communicating is allowed), or terminal A receives an instruction from its user interface, terminal A will retransmit a WLAN call request to terminal B.

In WWAN-to-WLAN state, if the VVLAN interface of terminal A or B turns to be unavailable, the terminal whose WLAN interface turns unavailable will return to WWAN active state from WWAN-to-WLAN state.

2. Handover from WLAN Interface to WWAN Interface

Figure 7:
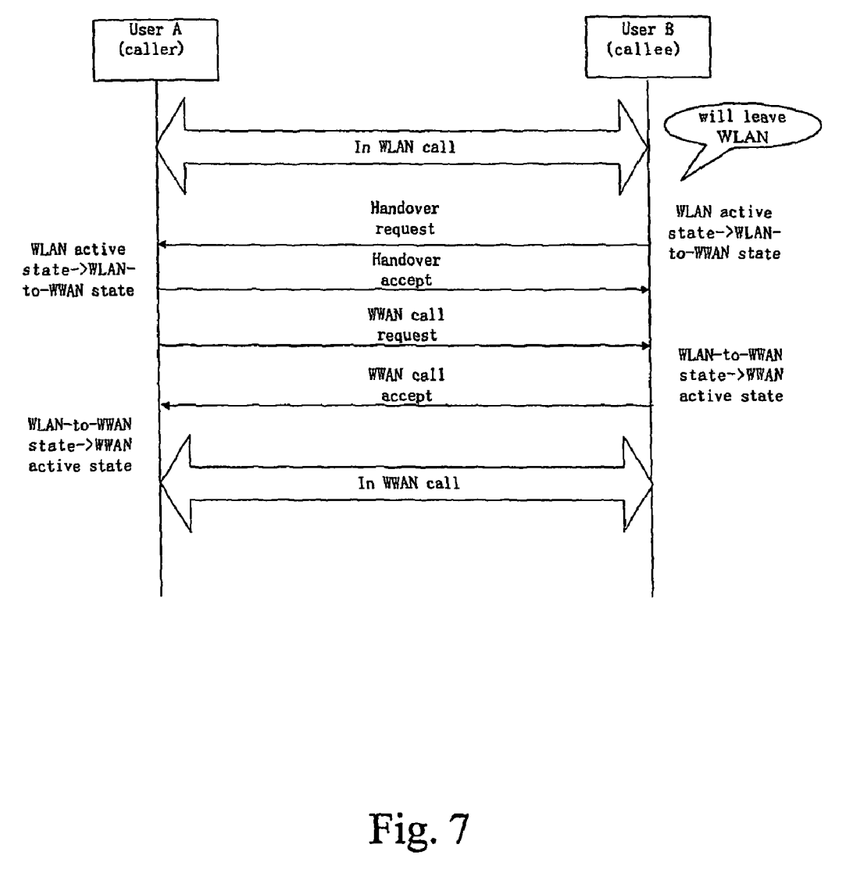
FIG. 7 is a schematic diagram illustrating the handover from WLAN interface to WWAN interface in accordance with the present invention.

As illustrated in FIG. 7, let's suppose that the called user B who is carrying out a WLAN communication is about to leave the WLAN service area. The Smart Agent in terminal B finds that its WLAN interface is going to be unavailable, then terminal B transfers from WLAN Active state to WLAN-to-WWAN state.

In the transition state, terminal B first sends a request for handover to WWAN to terminal A. Terminal A enters into WLAN-to-WWAN state on receipt of this request. In this state, terminal A sends a message for accepting the handover request back to terminal B, and meanwhile terminal A sends a WWAN call request to terminal B. On receipt of the WWAN call request, terminal B transfers to WWAN Active state, and sends a message for accepting the WWAN call request to terminal A. On receipt of the message for accepting the WWAN call request, terminal A transfers to WWAN Active state from WLAN-to-WWAN state. Once terminal A and terminal B are both in WWAN active state, the radio resource occupied by their former WLAN communication will be released, and the two terminals can communicate via WWAN interface. Meanwhile terminal B informs the Smart Server about its absence information instantly.

If the WLAN interface of terminal B becomes available again in WLAN-to-WWAN state (i.e. user B still stays in the WLAN service area), terminal A and B will go back to WLAN Active state.

The handover procedure from WWAN interface to WLAN interface or from WLAN interface to WWAN interface in the present invention is realized by the Smart Agent in user terminals and the Smart Server in the pub server in a cooperative way, wherein said Smart agent and Smart server can be implemented in function modules of software or hardware.

Beneficial Results of the Invention

As described above, with regard to the method and apparatus for handover between WLAN and WWAN interfaces proposed in the present invention, the Smart Agent and Smart Server are introduced, with which two mobile terminals performing WWAN communication before entering into the WLAN service area, can transfer to WLAN communication after entering into WLAN service area, and go back to WWAN communication when it is going to leave the WLAN service area, thus to make full use of the WLAN resource, and save the cost for end users and save WWAN resource for operators as well.

Furthermore, the method for communicating via different radio interfaces as proposed in this invention, is applicable not only to two user terminals with WLAN and WWAN radio interfaces, but also to two user terminals of which one party is equipped with WLAN and WWAN interfaces while its peer is a device with functions of network and telephone, for instance, a device combining the functions of telephone and computer (this combination is a logic combination usually, that is to say, a telephone number in the peer's user profile is combined with a user in a public server, and the user in the public server can get access to this service using a computer anywhere). However, if one party of the communication is an apparatus that can get access to Internet and support voice communication, the handover procedure from WWAN to WLAN or from WLAN to WWAN has to be initiated by a user terminal with WLAN and WWAN interfaces.

It's to be understood by those skilled in the art that the method and apparatus for handover between WWAN and WLAN as disclosed in this invention can be modified considerably without departing from the spirit and scope of the invention as defined by the appended claims. The embodiments of invention will be further described with reference to the accompanying drawings. FIG. 1 shows an optical disc according to the first embodiment of the invention. Optical disc 1 of the embodiment comprises substrate 110 and protecting layer 120. Substrate 110 comprises pre-recorded groove 112 integrally formed by mould-pressing. The surface of pre-recorded groove 112 on substrate 110 is coated with first recording layer 114, and first recording layer 114 is formed to become undulate along pre-recorded groove 112 to position the optical head, to trace the address, to control the rotating speed of the optical disc and so on by the undulation. In-between layer 115 is provided further on first recording layer 114. In-between layer 115 is a transparent glutinous layer, so that it will substantially fill and level up the undulation on first recording layer 114. The top surface of in-between layer 115 is coated with second recording layer 116 having a substantially flat and smooth surface, so that positioning the optical head, tracing the address and controlling the rotating speed of the optical disc should be implemented with reference to first recording layer 114 when the data information is recorded onto second recording layer 115. Protecting layer 120 covers second recording layer 116.

Both first recording layer 114 and second recording layer 116 of optical disc 1 include many sub-layers, such as first dielectric layers, functioning layers, second dielectric layers, reflecting layers (or semi-reflecting layers), etc., the same structure as the recording layer of optical disc in the prior art, thus not shown in the drawings.

In these structures of respective layers of optical disc 1, substrate 110 is generally formed of polycarbonate, or of glass, PMMA or other organic material.

In the respective sub-layers contained in first recording layer 114 and second recording layer 116, the reflecting layer (or the semi-reflecting layer) can be formed of gold, silver, aluminum, etc.; the dielectric layer can be mainly formed of SiO—ZnS, Si3N4, SiC, etc.; the functioning layer can usually be formed of the one-off recording materials or the erasable recording materials, the one-off recording material usually can be the dyestuff, such as dye, phthalocyanine, azo, etc., the erasable recording material can be phase-change alloy or photochromic molecules.

In-between layer 115 is generally formed of transparent resin. Protecting layer 120 is mainly formed of UV cured lacquer. Protecting layer 120 can be formed of the same material as substrate 110.

FIG. 2A to FIG. 2E are flow charts showing the manufacturing processes of optical disc 1 of the first embodiment. When manufacturing optical disc 1, firstly, pre-recorded groove 112 is formed on substrate 110 by mould-pressing; secondly, the surface of pre-recorded groove 112 in substrate 110 is coated with first recording layer 114 which becomes undulate along pre-recorded groove 112; thirdly, first recording layer 114 is coated with in-between layer 115 which will substantially fill and level up the undulation on first recording layer 114 to make the top surface of in-between layer substantially flat and smooth; then, the top surface of in-between layer 115 is coated with substantially flat and smooth second recording layer 115; and finally, protecting layer 120 is further stuck and attached on substantially flat and smooth second recording layer 116, completing the manufacture of optical disc 1.

Aforementioned optical disc 1 is only an embodiment of the invention Optical disc 1 has only two recording layers, in fact, second recording layer 116 can be coated with another in-between layer 117, as shown in FIG. 3; then the surface of in-between layer 117 is further coated with substantively flat and smooth third recording layer 118; and then protecting layer 120 is stuck and attached on the substantively flat and smooth third recording layer so as to form three-recording-layer disc 1' as shown in FIG. 3. Similarly, four-recording-layer optical disc, even five-recording-layer or six-recording-layer optical disc can also be made, thereby the multi-recording-layer optical discs can be manufactured using a very simple method.

In the optical disc of the invention only one layer for recording the data information becomes undulate, and other layers for recording the data information are substantially flat and smooth, with which the in-between layer are coated directly and respectively, so that it is unnecessary that the stamper must be used once more when a new recording layer is required to be added on the optical disc, not only saving the stampers, but also increasing the productivity and reducing the production cost.

How to read the data information from and how to record the data information onto the optical disc of the invention will be described with respect to optical disc 1 according to the first embodiment of the invention.

The method for reading the data information from optical disc 1 according to the first embodiment of the invention is the same as that used in the dual-layer optical disc in the prior art; and the method for recording the data information onto first recording layer 114 having the undulate surface of dual-layer optical disc 1 is the same as that used in the dual-layer optical disc in the prior art.

However, the method for recording the data information onto second recording layer 116 of optical disc 1 is different from the one for recording the data information onto the dual-layer optical disc in the prior art. The reason is that the surface of second recording layer 116 is flat and smooth, the address information can not be traced, so that an optical device 2 similar to that as shown in FIG. 4 must be used to realize recording of data information.

In optical device 2 shown in FIG. 4, data laser beam A transmitted by first semiconductor laser device 21 passes through first collimating lens 22, polarizing spectroscope 23, quarter-wave plate 24, double-tone spectroscope 25 and object lens 26 in sequence, then is reflected back after reaching second recording layer 116 of optical disc 1, and then reaches photo-electric converter 28 through detector lens 27. However, the surface of second recording layer 116 is flat and smooth, the address can not be traced, so that it is impossible to record the data information onto second recording layer 116 only by data laser beam A, therefore, service laser beam B is added in optical device 2 to assist data laser beam A to record the data information onto second recording layer 116. Service laser beam B is transmitted by second semiconductor laser device 31 which is on only when the data information is recorded onto substantially flat and smooth second recording layer 116, passes through holographic grating 32, second collimating lens 33, double-tone spectroscope 25 in sequence, and then passes through object lens 26 along with data laser beam A, wherein service laser beam B is focused on first recording layer 114 to trace the address information on first recording layer 114 so as to assist data laser beam A incident on second recording layer 116 to record the data information onto second recording layer 116. When being reflected back, service laser beam B is deflected to second photo-electric converter 34 through holographic grating 32.

When the data information has been recorded onto substantially flat and smooth second recording layer 116, the address information can be stored by means of the physical change of second recording layer 116, so that service laser beam B is unnecessary when reading the data information.

While the present invention is described with reference to the specific embodiment, it is apparent for those skilled in the art to make some alternatives, modifications and changes according to above description. All of these alternatives, modifications and changes should be included in the present invention when they fall in the spirit and the scope of the appendent claims.

What is claimed is:

1. A method to be performed by a user terminal with Wireless Wide Area Network (WWAN) and Wireless Local Area Network (WLAN) interfaces, comprising:
   communicating via the WWAN interface;
   detecting whether its WLAN interface is available;
   entering into a WWAN-to-WLAN state from a WWAN active state if its WLAN interface is available, the WWAN-to-WLAN state being a state of transferring a call from the WWAN interface to the WLAN interface;
   providing its presence information to a public server with known address in said WWAN-to-WLAN state.

2. The method according to claim 1, wherein said presence information at least contains the address, connection type and port information of said user terminal.

3. The method according to claim 2, further comprising:
   acquiring the network address of another user terminal communicating with said user terminal from said server;
   sending a WLAN call request to said another user terminal by using said network address.

4. The method according to claim 3, wherein step (e) includes:
   receiving the state information of said another user terminal from said server;
   obtaining the network address of said another user terminal from said state information.

5. The method according to claim 4, further comprising:
   receiving the information containing the network address of said another user terminal from said server if the network address of said another user terminal is not contained in said state information.

6. The method according to claim 3, wherein step (e) includes:
   sending a state inquiry request to said server so as to acquire the status information of said another user terminal;
   receiving the state information of said another user terminal from said server;
   obtaining the network address of said another user terminal from said state information.

7. The method according to claim 3, further comprising:
   entering into a WLAN active state if receiving the message for accepting the WLAN call request from said another user terminal.

8. The method according to claim 3, further comprising:
   maintaining the said WWAN-to-WLAN state if receiving the message for rejecting the WLAN call request from said another user terminal.

9. The method according to claim 8, further comprising:
   re-transmitting said WLAN call request to said another user terminal according to the instruction information of the user.

10. The method according to claim 3, wherein the step to be taken before said step (f), further includes:
    judging whether it is preferred to communicate with the WLAN interface according to the profile information in said user terminal, and continuing to execute step (f) if the profile information of said user terminal indicates that it is preferred to communicate via the WLAN interface.

11. The method according to claim 1, further comprising:
    returning to WWAN active state if inspecting said WLAN interface is not available in said WWAN-to-WLAN state.

12. A method to be performed by a user terminal with WWAN and WLAN interfaces, comprising:
    communicating via the WWAN interface;
    receiving a WLAN call request from another user terminal communicating with said user terminal;
    sending a response for accepting the WLAN call request to said another user terminal if a profile information indicates that said user terminal can switch radio interfaces during communication course with said another user terminal, according to the profile information of said user terminal;
    entering into the WLAN active state.

13. The method according to claim 12, further comprising:
    sending a response for rejecting the WLAN call request to said another user terminal if said profile information indicates that said user terminal cannot switch radio interfaces during communication course according to the profile information of said user terminal.

14. A method with telephony function to be performed by a user terminal, for accessing Internet and supporting, online communication services, comprising:
    receiving a WLAN call request from another user terminal with WLAN and WWAN interfaces communicating with said user terminal;
    sending a response for accepting the WLAN call request to said another user terminal if a profile information indicates that said user terminal can switch to communicate via Internet during communication procedure with said another user terminal, according to the profile information in said user terminal;
    entering into the state of communicating-via-Internet.

15. The method according to claim 14, further comprising:
    sending a response for rejecting the WLAN call request to said another user terminal if said profile information indicates that said user terminal cannot switch to communicate via Internet during communication course.

16. A method to be performed by a user terminal with WWAN interface and WLAN interfaces, comprising:
    communicating via the WLAN interface;
    inspecting whether the WLAN interface of said user terminal is available;
    entering into a WLAN-to-WWAN state from a WWAN active state if said WLAN interface is not available, the WLAN-to-WWAN state being a state of transferring a call from the WLAN interface to the WWAN interface;
    sending a WWAN call request to another user terminal communicating with said user terminal in the WLAN-to-WWAN state.

17. The method according to claim 16, further comprising:
    entering into the WWAN active state if receiving the message for accepting the WWAN call request from said another user terminal;
    providing a public server with known network address with the absence information of said user terminal.

18. The method according to claim 17, further comprising:
    releasing the radio resource occupied by communication via the WLAN interface after entering into the WWAN active state.

19. The method according to claim 16, further comprising:
    returning to the WWAN idle state if said communication is terminated or interrupted;
    providing a public server with known network address with the absence information of said user terminal.

20. The method according to claim 16, further comprising:
    returning to WLAN active state if inspecting said WLAN interface is available in said WLAN-to-WWAN state.

21. A method to be performed by a user terminal with WWAN and WLAN interfaces, comprising:
    communicating via the WLAN interface;
    inspecting whether the WLAN interface of said user terminal is available;
    entering into WWAN state from WLAN active state if the WLAN interface is not available;
    sending a handover request to another user terminal communicating with said user terminal in a WLAN-to-WWAN state, the WLAN-to-WWAN state being a state of transferring a call from the WLAN interface to the WWAN interface.

22. The method according to claim 21, further comprising:
    sending a message for accepting the WWAN call request to said another user terminal after receiving the WWAN call request transmitted from said another user terminal, and entering into WWAN active state;
    providing a public server with known network address with the absence information of the user using said user terminal.

23. The method according to claim 21, further comprising:
returning to WWAN idle state if said communication is terminated or interrupted;
providing a public server with known network address with the absence information of the user using said user terminal.

24. The method according to claim 21, further comprising:
returning to WLAN active state if inspecting said WLAN interface is available in said WLAN-to-WWAN state.

25. A method to be performed by a user terminal with WWAN and WLAN interfaces, comprising:
communicating via the WLAN interface;
receiving a handover request sent from another user terminal communicating with said user terminal so as to enter into a WLAN-to-WWAN state from the state of communicating via the WLAN interface;
sending a WWAN call request to said another user terminal in the WLAN-to-WWAN state;
receiving the message for accepting the WWAN call request from said another user terminal in the WLAN-to-WWAN state;
entering into WWAN active state from the WLAN-to-WWAN state.

26. A user terminal with WWAN and WLAN interfaces, comprising:
a communicating unit configured to communicate via the WWAN interface;
an inspecting unit configured to determine whether the user terminal's WLAN interface is available;
a handover unit configured to perform a handover to a WWAN-to-WLAN state from a WWAN active state upon determining that said WLAN interface is available, the WWAN-to-WLAN state being a state of transferring a call from the WWAN interface to the WLAN interface;
a sending unit configured to provide a public server with known network address with the presence information of said user terminal while in the WWAN-to-WLAN state.

27. The user terminal according to claim 26, comprising:
an acquiring unit configured to acquire the address of said another user terminal communicating with said user terminal from said server;
said sending unit configured to send a WLAN call request to said another user terminal by using said address;
said handover unit configured to perform a handover to a WLAN active state upon receiving the message for accepting the WLAN call request from said another user terminal.

28. The user terminal according to claim 26, comprising:
said communicating unit configured to communicate via said WLAN interface;
said handover unit configured to perform a handover from a WLAN active state to a WLAN-to-WWAN state upon a determination by said inspecting unit that said WLAN interface is not available;
said sending unit configured to send a WWAN call request to said another user terminal communicating with said user terminal;
said handover unit configured to perform a handover to a WWAN active state upon receiving a message for accepting the WWAN call request from said another user terminal.

29. The user terminal according to claim 26, wherein:
said communicating unit configured to communicate via said WLAN interface;
said handover unit configured to perform a handover to a WLAN-to-WWAN state from a WLAN active state upon a determination by said inspecting unit that said WLAN interface is not available, the WLAN-to-WWAN state being a state of transferring a call from the WLAN interface to the WWAN interface;
said sending unit configured to send a handover request to said another user terminal communicating with said user terminal;
said sending unit sends a message for accepting the WWAN call request to said another user terminal after receiving a WWAN call request transmitted from said another user terminal, and said handover unit is configured to perform a handover to a WWAN active state.

30. A user terminal with WWAN and WLAN interfaces, comprising:
a communicating unit configured to communicate via the WWAN interface;
a receiving unit configured to receive a WLAN call request from another user terminal communicating with said user terminal;
a sending unit configured to send a response for accepting said WLAN call request to said another user terminal if a profile information indicates that said user terminal can switch radio interfaces during communication course with said another user terminal, according to the profile information of said user terminal;
a handover unit configured to perform a handover to a WLAN active state.

31. The user terminal according to claim 28, wherein:
said communicating unit configured to communicate via said WLAN interface;
said handover unit configured to receive a handover request from said another user terminal communicating with said user terminal, and to perform a handover from the state of communicating with said WLAN interface to a WLAN-to-WWAN state, the WLAN-to-WWAN state being a state of transferring a call from the WLAN interface to the WWAN interface;
said sending unit configured to send a WWAN call request to said another user terminal;
said receiving unit configured to receive the message for accepting the WWAN call request from said another user terminal; and
said handover unit configured to perform a handover from said WLAN-to-WWAN state to a WWAN active state.

* * * * *